US010024216B2

(12) United States Patent
Chenoweth et al.

(10) Patent No.: US 10,024,216 B2
(45) Date of Patent: Jul. 17, 2018

(54) RETENTION SYSTEM FOR AFTERTREATMENT MODULE

(71) Applicant: Caterpillar Inc., Peoria, IL (US)

(72) Inventors: Kurtis Edward Chenoweth, Ipava, IL (US); David Allen Akers, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/381,018

(22) Filed: Dec. 15, 2016

(65) Prior Publication Data

US 2018/0171852 A1   Jun. 21, 2018

(51) Int. Cl.
*F01N 3/10* (2006.01)
*F01N 3/28* (2006.01)
*B01D 53/94* (2006.01)

(52) U.S. Cl.
CPC ............. *F01N 3/286* (2013.01); *B01D 53/94* (2013.01)

(58) Field of Classification Search
CPC .... F01N 3/2828; F01N 3/2864; F01N 3/2853; F01N 2310/02; F01N 3/286; C04B 14/308; B01D 53/94
USPC .......................... 422/179, 180; 428/76, 315.9
See application file for complete search history.

(56) References Cited

U.S. PATENT DOCUMENTS

| 3,944,505 | A |   | 3/1976  | LaCroix |          |
|-----------|---|---|---------|---------|----------|
| 4,004,888 | A | * | 1/1977  | Musall  | F01N 3/2853 |
|           |   |   |         |         | 138/108  |
| 4,160,010 | A | * | 7/1979  | Ottle   | F01N 3/2853 |
|           |   |   |         |         | 422/180  |
| 4,238,455 | A |   | 12/1980 | Ogiwara |          |
| 4,324,701 | A |   | 4/1982  | Honda et al. |     |
| 4,859,428 | A |   | 8/1989  | Brand et al. |     |
| 6,670,020 | B1| * | 12/2003 | Maus    | F01N 3/2857 |
|           |   |   |         |         | 277/606  |
| 2005/0042151 | A1 | * | 2/2005 | Alward  | B01D 39/2082 |
|           |   |   |         |         | 422/177  |
| 2010/0044300 | A1 | * | 2/2010 | Yamaguchi | B01D 46/2429 |
|           |   |   |         |         | 210/446  |
| 2011/0023430 | A1 | * | 2/2011 | Kumar   | B01D 46/2422 |
|           |   |   |         |         | 55/486   |
| 2011/0030355 | A1 |   | 2/2011 | Gilmer et al. |   |

FOREIGN PATENT DOCUMENTS

WO   WO 2014/199008 A1   12/2014
WO   WO 2016/036802 A1   3/2016

* cited by examiner

*Primary Examiner* — Tom P Duong
(74) *Attorney, Agent, or Firm* — Finnegan, Henderson, Farabow, Garrett & Dunner, LLP

(57) ABSTRACT

A retention system for use with an aftertreatment module is disclosed. The retention system may include a first support mat disposed on at least one surface of the at least one catalyst substrate. The retention system may also include at least one support plate having a corrugated portion disposed on the first support mat. The retention system may further include a second support mat disposed on the corrugated portion.

4 Claims, 4 Drawing Sheets

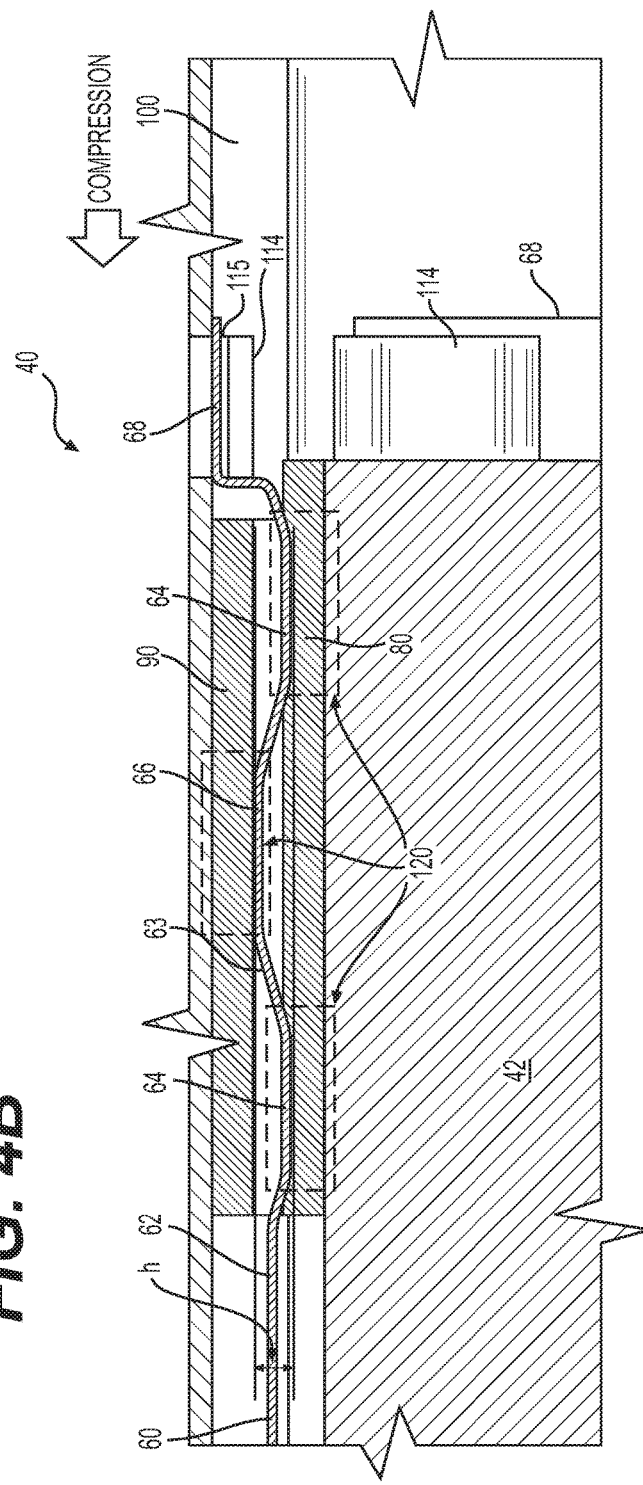
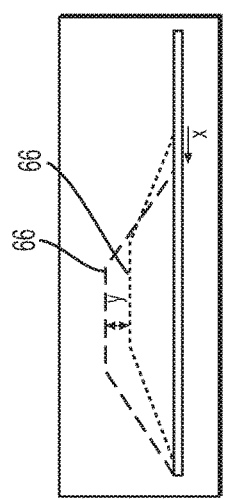

RETENTION SYSTEM FOR AFTERTREATMENT MODULE

TECHNICAL FIELD

The present disclosure is directed to a retention system and, more particularly, to a retention system for an aftertreatment module.

BACKGROUND

Internal combustion engines, including diesel engines, gasoline engines, gaseous fuel-powered engines, and other engines known in the art exhaust a complex mixture of air pollutants. These air pollutants are composed of gaseous compounds including, among other things, the oxides of nitrogen ($NO_X$). Due to increased awareness of the environment, exhaust emission standards have become more stringent, and the amount of $NO_X$ emitted to the atmosphere by an engine may be regulated depending on the type of engine, size of engine, and/or class of engine.

In order to comply with the regulation of $NO_X$, some engine manufacturers have implemented one or more strategies for dealing with emissions. One exemplary strategy is called selective catalytic reduction (SCR). SCR is an exhaust treatment process where a reductant, most commonly urea (($NH_2$)$_2$CO) or a water/urea solution, is selectively injected into the exhaust gas stream of an engine and adsorbed onto a downstream catalyst. The injected urea solution decomposes into ammonia ($NH_3$), which reacts with $NO_X$ in the exhaust gas to form water ($H_2O$) and diatomic nitrogen ($N_2$), which may be unregulated substances.

In some applications of SCR strategies and other exhaust treatment strategies, multiple catalysts may be required for greater emissions control requirements. However, there can be large tolerance variations amongst the catalysts, which can lead to problems with packaging multiple catalysts together. In addition, the catalysts can bulge when subject to increased temperatures during operation, and the bulging can result in additional problems when packaging multiple catalysts together. Specifically, the bulging and increased pressure can cause damage to the catalysts and make it difficult to stack and package multiple catalysts, while retaining a desired shape of the package.

One attempt to improve packaging of multiple catalysts is described in U.S. Pat. No. 4,859,428 ("the '428 patent") to Brand et al. that was issued on Aug. 22, 1989. In particular, the '428 patent describes an apparatus for the support and containment of monolithic ceramic catalyst elements. The apparatus includes an elastic gasket attached on one or both monolith ends and a metal frame attached on the gasket under pressure. The frame has recesses on two adjacent lateral surfaces, and projections on at least two opposite lateral surfaces which can engage interlockingly into the recesses of adjacent frames.

While the apparatus of the '428 patent may help to improve packaging of multiple catalysts, it may be less than optimal. Specifically, while the gasket and metal frame of the apparatus of the '428 patent may contain a group of catalysts, the apparatus of the '428 patent does not retain each catalyst individually within the group to provide additional support and stability. Further, the apparatus of the '428 patent does not adequately retain a desired shape and size of the package, such that other packages of multiple catalysts may be stacked together.

The retention system of the present disclosure solves one or more of the problems set forth above and/or other problems with existing technologies.

SUMMARY

One aspect of the present disclosure is directed to a retention system for an aftertreatment module having at least one catalyst substrate. The retention system may include a first support mat disposed on at least one surface of the at least one catalyst substrate. The retention system may also include at least one support plate having a corrugated portion disposed on the first support mat. The retention system may further include a second support mat disposed on the corrugated portion.

A second aspect of the present disclosure is directed to another retention system for an aftertreatment module having at least one catalyst substrate. The retention system may include a first support mat disposed on at least one surface of the at least one catalyst substrate. The retention system may also include at least one support plate having a corrugated portion disposed on the first support mat and a tab portion extending from the corrugated portion. The retention system may further include a second support mat disposed on the corrugated portion. The retention system may further include an outer sleeve configured to be disposed on the second support mat and having at least protrusion forming a slot configured to receive the tab portion.

A third aspect of the present disclosure is directed to a retention system for an aftertreatment module having a plurality of catalyst substrates. The retention system may include a plurality of first support mats, each first support mat being disposed on at least one surface of a respective catalyst substrate. The retention system may also include a plurality of support plates, each support plate having a corrugated portion disposed on a respective first support mat and a tab portion extending from the corrugated portion. The retention system may further include a plurality of second support mats disposed on at least one respective corrugated portion. The retention system may further include an outer sleeve configured to be disposed on the plurality of second support mats and having a plurality of protrusions forming respective slots configured to receive respective tab portions of the plurality of support plates.

BRIEF DESCRIPTION OF THE DRAWING

FIGS. 4A and 4B are partial cross-sectional illustrations of a portion of the disclosed retention system that may be utilized in conjunction with the power system of FIG. 1.

DETAILED DESCRIPTION

Figure 1:
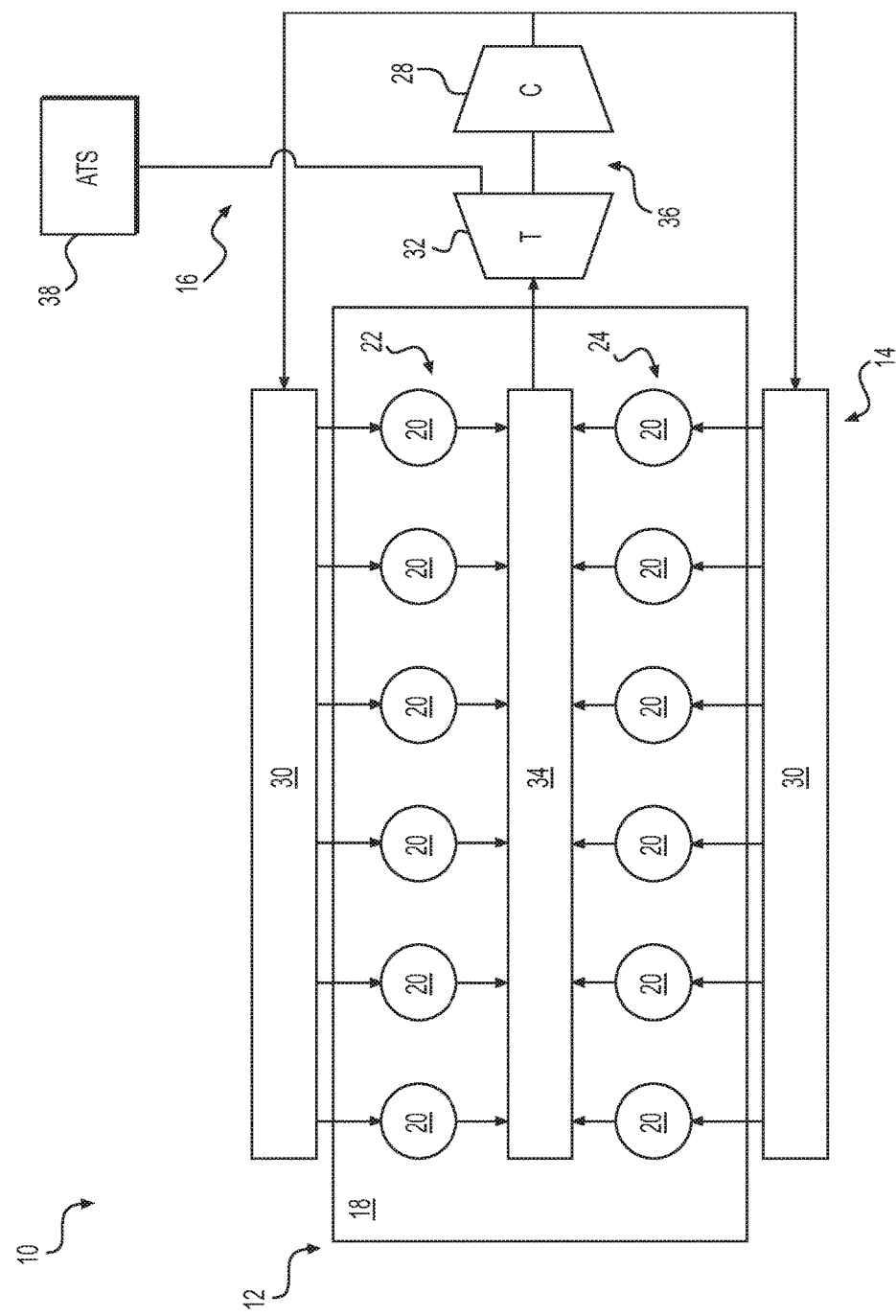
FIG. 1 is a schematic illustration of an exemplary disclosed power system.

FIG. 1 illustrates an exemplary power system 10 having an engine 12, an air induction system 14, and an exhaust system 16. Engine 12 may embody any large, multi-cylinder internal combustion engine that is diesel, gasoline, or gaseous-fueled. It is contemplated that engine 12 may be associated with a mobile machine (e.g., a locomotive) or a stationary system (e.g., a power producing system), which may include one or more additional components, such as a generator driven by a mechanical output of engine 12. Air induction system 14 may be configured to direct air or a mixture of air and fuel into engine 12 for combustion. Exhaust system 16 may be configured to treat and discharge byproducts of a combustion process occurring within cylinders of engine 12 to the atmosphere.

Engine 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, engine 12 includes twelve cylinders 20 arranged in a V-configuration (i.e., a configuration having first and second banks 22, 24 or rows of cylinders 20). However, it is contemplated that engine 12 may include a greater or lesser number of cylinders 20 and that cylinders 20 may be arranged in an inline configuration, in an opposing-piston configuration, or in another configuration, as desired.

Air induction system 14 may include, among other things, at least one compressor 28 that may embody a fixed geometry compressor, a variable geometry compressor, or any other type of compressor configured to receive air and compress the air to a desired pressure level. Compressor 28 may direct air to one or more intake manifolds 30 associated with engine 12. It should be noted that air induction system 14 may include multiple compressors 28 arranged in a serial configuration, a parallel configuration, or a combination serial/parallel configuration.

Exhaust system 16 may include, among other things, an exhaust manifold 34 connected to one or both of banks 22, 24 of cylinders 20. Exhaust system 16 may also include at least one turbine 32 driven by the exhaust from exhaust manifold 34 to rotate compressor 28 of air induction system 14. Compressor 28 and turbine 32 may together form a turbocharger 36. Turbine 32 may be configured to receive exhaust and convert potential energy in the exhaust to a mechanical rotation. It should be noted that exhaust system 16 may include multiple turbines 32 arranged in a serial configuration, a parallel configuration, or a combination serial/parallel configuration, as desired.

After exiting turbine 32, the exhaust may be discharged to the atmosphere through an aftertreatment system 38 that may include, for example, a diesel oxidation catalyst (DOC), a diesel particulate filter (DPF), a hydrocarbon doser, and/or any other treatment device known in the art, if desired. The aftertreatment devices may be configured to treat, condition, and/or otherwise reduce constituents of the exhaust before the exhaust is discharged to the atmosphere.

Figure 2:
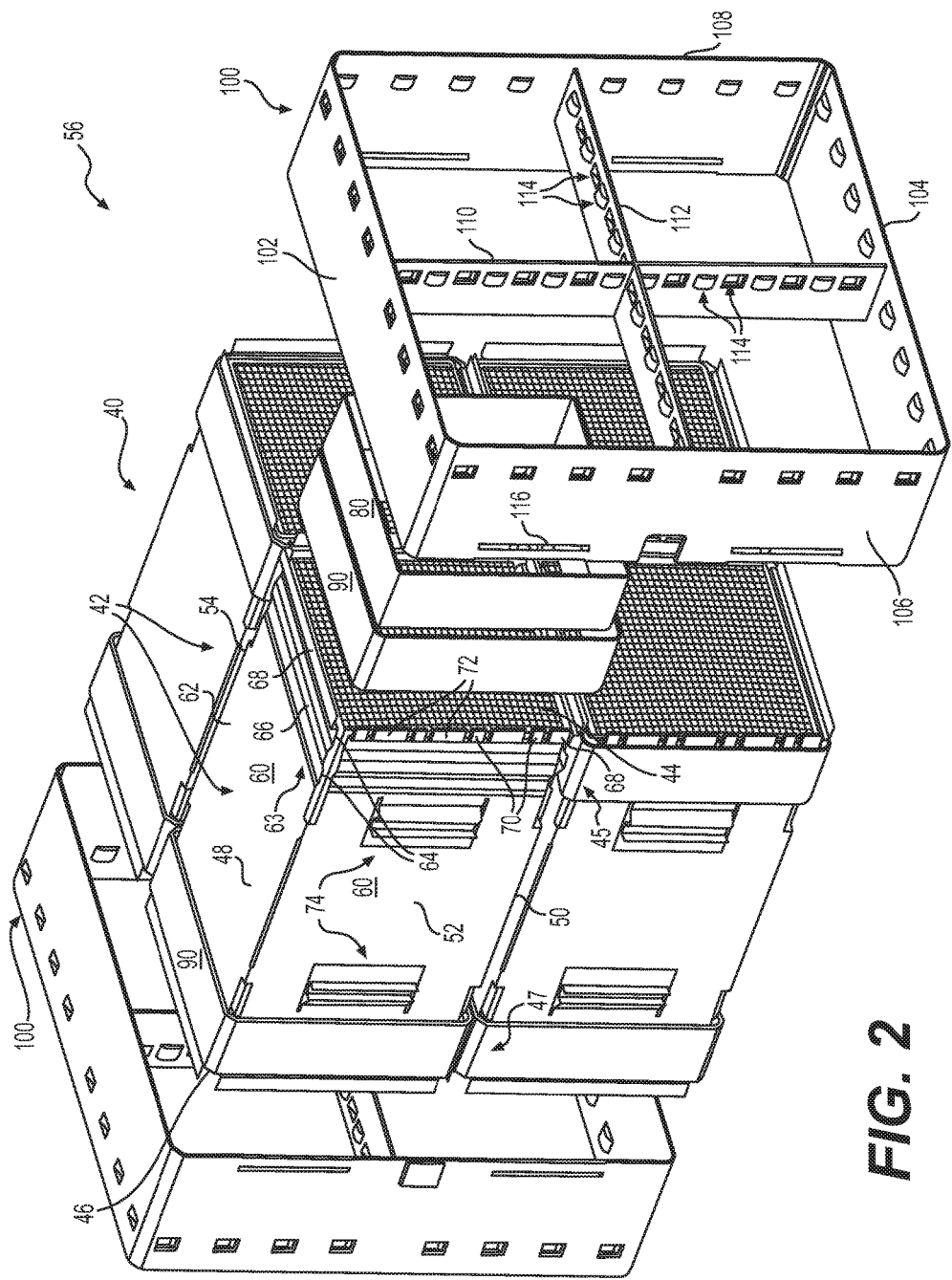
FIG. 2 is an exploded view illustration of an exemplary disclosed retention system and aftertreatment module that may be utilized in conjunction with the power system of FIG. 1.

One or more aftertreatment devices may form an aftertreatment module, such as, for example, aftertreatment module 40 shown in FIG. 2. Aftertreatment module 40 may include, amongst other things, at least one catalyst substrate 42. In the illustrated embodiment, aftertreatment module 40 includes four catalyst substrates 42. However, it is contemplated that, in other embodiments, aftertreatment module 40 may include any number of catalyst substrates 42, as desired. For example, aftertreatment module 40 may include different arrays of catalyst substrates 42 (e.g., 2×2, 3×3, 4×4) depending on the size of the engine and desired emissions level. In addition, one or more arrays of catalyst substrates 42 may also be stacked on top of or positioned next to one another, as desired.

Each catalyst substrate 42 may be, for example, a Selective Catalytic Reduction (SCR) type of substrate. Specifically, catalyst substrate(s) 42 may be fabricated from or otherwise coated with a ceramic material such as titanium oxide; a base metal oxide such as vanadium and tungsten; zeolites; and/or a precious metal. With this composition, decomposed reductant entrained within the exhaust may be adsorbed onto the surface and/or absorbed within each catalyst substrate 42. The reductant may then react with NOx (NO and $NO_2$) in the exhaust gas to form water ($H_2O$) and diatomic nitrogen ($N_2$), which may be unregulated substances. It should be noted, however, that in other embodiments, catalyst substrate(s) 42 may alternatively be different types of substrates. For example, the catalyst substrate(s) 42 could be Diesel Oxidation Catalyst (DOC) substrates. Specifically, catalyst substrate(s) 42 may be fabricated from or otherwise coated with a precious metal such as palladium, platinum, vanadium, or a mixture thereof. With this composition, each catalyst substrate 42 may catalyze a chemical reaction to alter the exhaust passing through aftertreatment module 40. For example, catalyst substrate(s) 42 may help to convert or otherwise reduce CO, NO, HC, and/or other constituents of the exhaust from the engine(s) into harmless substances such as $CO_2$, $NO_2$, and $H_2O$. In another embodiment, catalyst substrate(s) 42 may alternatively or additionally perform particulate trapping functions (i.e., catalyst substrate(s) 42 may be catalyzed particulate traps), if desired.

In some embodiments, catalyst substrate(s) 42 may be arranged into bricks or packs having a substantially rectangular cross section (i.e., having a substantially cuboid shape). For example, each catalyst substrate 42 may have a front surface 44, a rear surface 46, a top surface 48, a bottom surface 50, a right side surface 52, and a left side surface 54. During engine operation, exhaust may enter each catalyst substrate 42 through front surface 44 at a front end 45 of catalyst substrate 42 and exit through rear surface 46 at a rear end 47 of catalyst substrate 42. In some operations, adjacent catalyst substrates 42 may be stacked on top of or positioned next to one or more of top surface 48, bottom surface 50, right side surface 52, and left side surface 54. Additionally, it is contemplated that one or more catalysts substrates 42 may be arranged in series, if desired. It should be noted that catalyst substrate(s) 42 may alternatively be arranged into other shapes, as desired.

In the disclosed embodiment, aftertreatment module 40 may be equipped with a retention system 56, in order to secure catalyst substrate(s) 42 and retain an overall shape of aftertreatment module 40. As shown in FIG. 2, retention system 56 may include at least one support plate 60, at least one first support mat 80, at least one second support mat 90, and at least one outer sleeve 100.

Support plate(s) 60 may be disposed on at least one surface of each catalyst substrate 42. In the disclosed embodiment, although not fully shown in FIG. 2, one support plate 60 is disposed on each of top surface 48, bottom surface 50, right side surface 52, and left side surface 54 of catalyst substrate 42. Adjacent support plates 60 may be connected to one another at corners of each catalyst substrate 42. It is contemplated, however, that in other embodiments, any number of support plates 60 may be disposed on one or more surfaces of each catalyst substrate 42.

Each support plate 60 may include a straight portion 62 extending between front end 45 of catalyst substrate 42 and rear end 47 of catalyst substrate 42. Straight portion 62 may be provided in direct contact with the respective surface of each catalyst substrate 42. At one or both of front and rear ends 45, 47 of catalyst substrate 42, support plate 60 may include a corrugated portion 63 having one or more grooves 64 and one or more ridges 66. As will be discussed in more detail below, grooves 64 and ridges 66 may be configured to be compressed upon assembly of support mats 80, 90 and outer sleeve 100. Support plate 60 may also include a tab portion 68 extending from corrugated portion 63 at an outer edge of support plate 60. In some embodiments, tab portion 68 may include a first tab 70 and a second tab 72 configured to connect to respective portions of outer sleeve 100. Additionally, in some embodiments, support plate 60 may include a ribbed portion 74 configured to connect to respective portions of outer sleeve 100.

In the disclosed embodiment, although not fully shown in FIG. 2, support plate 60 may have a first corrugated portion 63 located at front end 45 of catalyst substrate 42 and a second corrugated portion 63 located at rear end 47 of catalyst substrate 42. Straight portion 60 may extend between the first and second corrugated portions 63. In addition, the first and second corrugated portions 63 may be substantially the same, each being assembly with corresponding support mats 80, 90. It is contemplated, however, that support plate 60 may instead have only one corrugated portion 63 located at only one of front and rear ends 45, 47 of catalyst substrate 42, if desired.

Support mat 80 may be disposed on at least one surface of catalyst substrate 42, while support mat 90 may be disposed on corrugated portion 63 of support plate 60. With such a configuration, corrugated portion 63 of plate 60 may be positioned in between support mat 80 and support mat 90. In the disclosed embodiment, although not fully shown in FIG. 2, support mat 80 may substantially conform to a cross-sectional shape of catalyst substrate 42, such that support mat 80 substantially surrounds an outer perimeter of catalyst substrate 42. In particular, support mat 80 may be disposed on each of top surface 48, bottom surface 50, right side surface 52, and left side surface 54 of catalyst substrate 42. In addition, support mat 90 may have a substantially identical shape as support mat 80, while being slightly larger in size, such that support mat 90 may substantially surround all four support plate 60 surrounding support mat 80. It is contemplated, however, that in other embodiments, support mats 80, 90 may surround any number of surfaces of catalyst substrate 42, as desired.

Additionally, in the disclosed embodiment, although not fully shown in FIG. 2, one set of support mats 80, 90 may be associated with front end 45 of catalyst substrate 42, and another set of support mats 80, 90 may be associated with rear end 47 of catalyst substrate 42. However, it is contemplated that only one set of support mats 80, 90 may be utilized, if desired.

Support mats 80, 90 may be configured to secure catalyst substrate 42 within aftertreatment module 40 and absorb pressures from stacking multiple catalyst substrates 42. Support mats 80, 90 may each include one or more layers of material and be produced from a number of suitable materials. For example, support mats 80, 90 may include a number of suitable heat-resistant mats. The specific mat material may be selected based on desired physical properties including, for example, strength, heat resistance, specific heat, thermal expansion coefficients, flexibility, compressibility, and/or thermal conductivity. The mat material may also be selected based on manufacturability and/or cost. In one embodiment, mats 80, 90 may include a heat-resistant mat material including a refractory fiber material. A number of suitable refractory fiber materials may be selected including, for example, alumina silicate, aluminoborosilicate, and/or vermiculite. Support mats 80, 90 may further include combinations of various refractory-fiber materials and/or other additives, such as binders and/or fillers. The materials included in support mats 80, 90 may be selected based on desired expansion during heating. For example, in one embodiment, support mats 80, 90 may include a non-intumescent material, which may have little or no expansion at elevated temperatures. A non-intumescent material may be selected to prevent additional compression of catalyst substrate 42 during heating. For example, catalyst substrate 42 may be secured by support mats 80, 90, and additional compressive forces may not be necessary. Further, in some embodiments, a non-intumescent material may be selected to prevent excessive compressive forces, which may damage catalyst substrate 42.

Outer sleeve 100 may be configured to be disposed on support mat 90 surrounding one or more catalyst substrates 42. For example, as shown in FIG. 2, outer sleeve 100 may have a top portion 102, a bottom portion 104, a right side portion 106, a left side portion 108, a vertical portion 110, and a horizontal portion 112, such that outer sleeve 100 may contain each catalyst substrate individually, while also retaining an overall shape of aftertreatment module 40. In other embodiments, where fewer or more catalyst substrates 42 are utilized, outer sleeve 100 may have a different configuration.

Figure 3:
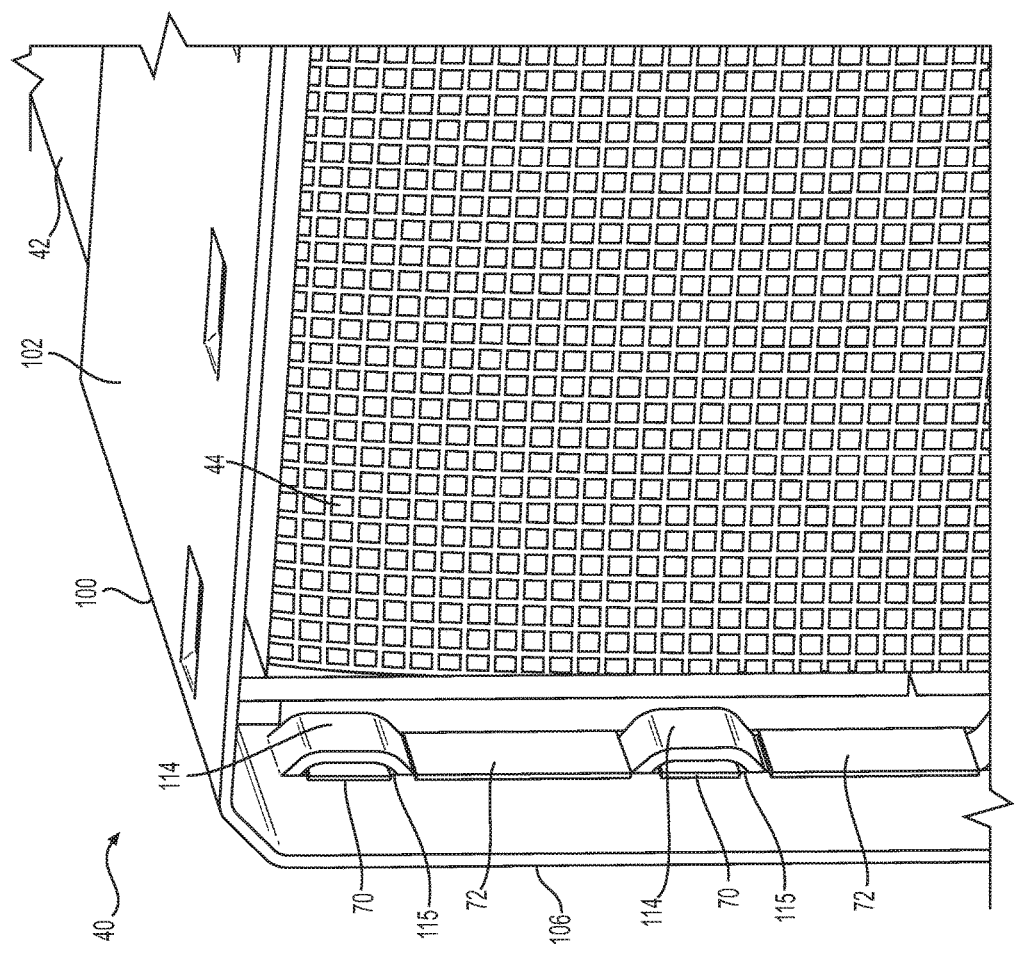
FIG. 3 is a pictorial illustration of a portion of the disclosed retention system that may be utilized in conjunction with the power system of FIG. 1.

Outer sleeve 100 may also include at least one protrusion 114 disposed on at least one of top portion 102, bottom portion 104, right side portion 106, left side portion 108, vertical portion 110, and/or horizontal portion 112. Protrusion 114 may form a slot 115 configured to at least partially receive tab portion 68. For example, as shown in FIG. 3, one or more first tabs 70 may be configured to slide into respective slots 115 of protrusions 114, while second tabs 72 may be configured to be positioned at a location in between adjacent protrusions 114. In some embodiments, there may be a plurality of tabs 70, 72 on each support plate 60 associated with a plurality of respective slots 115 of protrusions 114 on outer sleeve 100. Additionally, it is contemplated that, instead of tabs and slots, retention system 56 may alternatively utilize other known connection devices configured to connect outer sleeve 100 to aftertreatment module 40.

In some embodiments, outer sleeve 100 may also include one or more slits 116 configured to receive respective ribbed portions 74 of support plate(s) 60 to further secure outer sleeve 100 to aftertreatment module 40. For example, ribbed portion 74 may extend through slit 116 to prevent horizontal movement of outer sleeve 100 with respect to catalyst substrates 42.

FIGS. 4A and 4B illustrate partial cross-sectional views of retention system 56 upon assembly of outer sleeve 100. As shown in FIGS. 4A and 4B, as outer sleeve 100 is connected to support plate 60 (i.e., as tab portion 68 slides into slot 115 formed by protrusion 114), a compression force acts on corrugated portion 63 of plate 60 in a horizontal direction x, such that grooves 64 and ridges 66 move in horizontal direction x as well as a vertical direction y. In order words, grooves 64 and ridges 66 may be compressed with the installation of outer sleeve 100. This compression increases a distance h between grooves 64 and ridges 66, causing grooves 64 and ridges 66 to compress support mats 80, 90 in regions 120 where grooves 64 and ridges 66 contact support mats 80, 90. This arrangement may better support and secure catalyst substrate 42 within aftertreatment module 40.

INDUSTRIAL APPLICABILITY

The retention system of the present disclosure may be applicable to any aftertreatment module requiring retention of one or more aftertreatment devices, where packaging and sizing are important issues. The disclosed retention system may secure each aftertreatment device and account for increased pressures and bulging within the aftertreatment module. In addition, the disclosed retention system may retain an overall shape of the aftertreatment module, such that the aftertreatment module may be stacked on top of or positioned next to other aftertreatment modules.

Specifically, the arrangement of support plate(s) 60 and support mats 80, 90 around each catalyst substrate 42 may provide increased support and stability to each individual catalyst substrate 42. In particular, the use of a corrugated portion 63 between support mat 80 and support mat 90 may help to absorb increased pressure and prevent bulging of catalyst substrate 42. The use of outer sleeve 100 may also help to retain an overall shape of aftertreatment module 40, such that aftertreatment module 40 may be stacked on top of or positioned next to other aftertreatment modules more easily. As a result, the disclosed retention system may improve the packaging of one or more aftertreatment devices within an aftertreatment module in an efficient manner.

It will be apparent to those skilled in the art that various modifications and variations can be made to the retention system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A retention system for an aftertreatment module having a plurality of catalyst substrates, the retention system comprising:
    a plurality of first support mats, each first support mat being disposed on at least one surface of a respective catalyst substrate;
    a plurality of support plates, each support plate having a corrugated portion disposed on a respective first support mat and a tab portion extending from the corrugated portion;
    a plurality of second support mats disposed on at least one respective corrugated portion; and
    an outer sleeve configured to be disposed on the plurality of second support mats and having a plurality of protrusions forming respective slots configured to receive respective tab portions of the plurality of support plates.

2. The retention system of claim 1, wherein the outer sleeve is a first outer sleeve located at respective first ends of the plurality of catalyst substrates, and the retention system further comprises a second outer sleeve located at respective second ends of the plurality of catalyst substrates opposite the first ends.

3. The retention system of claim 2, wherein the respective corrugated portions are first corrugated portions located at respective first ends of the plurality of catalyst substrates, and the plurality of support plates include second corrugated portions located at respective second ends of the plurality of catalyst substrates.

4. The retention system of claim 3, wherein the plurality of first support mats and the plurality of second support mats are located at respective first ends of the plurality of catalyst substrates, and the retention system further comprises:
    a plurality of third support mats disposed on respective surfaces of the plurality of catalyst substrates at respective second ends of the plurality of catalyst substrates; and
    a plurality of fourth support mats disposed on respective second corrugated portions.

\* \* \* \* \*